United States Patent [19]

Santandrea et al.

[11] Patent Number: 5,060,781
[45] Date of Patent: Oct. 29, 1991

[54] APPARATUS FOR THE AUTOMATIC ADJUSTMENT OF PALLET WORKPIECE SUPPORT MEMBERS

[75] Inventors: Luciano Santandrea; Massimo Lombardi, both of Florence, Italy

[73] Assignee: Axis U.S.A., Inc., Marlborough, Mass.

[21] Appl. No.: 513,025

[22] Filed: Apr. 24, 1990

Related U.S. Application Data

[63] Continuation of Ser. No. 212,267, Jun. 27, 1988, abandoned.

[51] Int. Cl.$^5$ ............................................. B65G 21/20
[52] U.S. Cl. ............................... 198/345.1; 198/465.2; 198/803.01
[58] Field of Search ............... 198/345.1, 463.3, 465.1, 198/465.3, 465.2, 346.3, 803.01, 803.2

[56] References Cited

U.S. PATENT DOCUMENTS

| | | | |
|---|---|---|---|
| 3,880,074 | 4/1975 | Seifert | 198/345 X |
| 4,492,301 | 1/1985 | Inaba et al. | 198/345 X |
| 4,557,371 | 12/1985 | Yonezawa | 198/803.01 |
| 4,667,804 | 5/1987 | Dubuit et al. | 198/345 |
| 4,787,505 | 11/1988 | Tweedy | 198/803.01 |
| 4,803,882 | 2/1989 | Schonfeld et al. | 198/345 X |

FOREIGN PATENT DOCUMENTS

| | | |
|---|---|---|
| 149469 | 5/1986 | European Pat. Off. . |
| 3338423 | 2/1985 | Fed. Rep. of Germany . |
| 2038671 | 8/1979 | United Kingdom . |

Primary Examiner—D. Glenn Dayoan
Attorney, Agent, or Firm—Robert R. Jackson; Eric C. Woglom

[57] ABSTRACT

An apparatus for automatically adjusting the distance between two support members for carrying workpieces of different dimensions. The support members are mounted on guides that are fitted to pallets that travel on conveyor transport systems for automatic production/assembly lines. The support members have locking devices that frictionally secure the support members in place on the pallet and can be unlocked for movement along the guide. A positioning unit engages the pallet so that the locking devices is unlocked, and the support members are translated, under the control of the drive, to the desired relative position. A device for bringing a pallet and the positioning unit together to make the adjustment are provided. The positioning unit may have two movable carriages and a device for unlocking one or both support members from the guide, and drive for moving one or both of the carriages to slide one or both of the support members along the guides into their desired positions. In an alternate embodiment, the positioning unit may have only one carriage so that only one support member will be moved at a time. The carriages may be driven by a motor that can provide for an infinite number of intermediate positions within the extreme range of positions available.

2 Claims, 5 Drawing Sheets

APPARATUS FOR THE AUTOMATIC ADJUSTMENT OF PALLET WORKPIECE SUPPORT MEMBERS

This is a continuation of application Ser. No. 212,267, filed June 27, 1988, now abandoned.

BACKGROUND OF THE INVENTION

This invention relates to improvements in pallet conveyor production line systems including pallets that have support members that are adjustable for carrying workpieces of different dimensions, and particularly to an apparatus and method for the automatic adjustment of the distance between support members of a pallet that is adapted to carry different sized workpieces.

Pallet conveyor systems are used in automatic production lines where workpieces are to be subjected to a sequence of operations at successive workstations. A workpiece that is to be assembled, machined, or operated on is placed on support members that are mounted on a pallet. The pallet is set upon a moving conveyor belt that will advance the pallet and the workpiece to a series of workstations that perform the sequence of desired operations to complete the production cycle. A plurality of pallets carrying a like plurality of workpieces are typically used.

The pallets are frictionally driven by the conveyor. As a workpiece is brought to a workstation, the pallet is stopped and the work station operation is performed. While stopped, the pallet may continue to rest on the moving conveyor in sliding contact, or may be lifted off the moving conveyor belt. Depending on the desired operation, the workpiece may be worked upon while resting on the support members of the pallet, or it may be removed from the support members, worked upon, and then returned to the support members. At the conclusion of the operation, the pallet is released or placed back on the belt to advance to the next workstation. The pallets thus move asynchronously, i.e., pallets upstream of a stopped pallet will advance until they are stopped behind a stopped pallet while the conveyor continues to advance, individually or in sets or groups, and accumulate in order to wait their turn at the workstation.

Pallet conveyor production lines are adapted for performing the same operations on workpieces that belong to the same family of workpieces and require the same machining operations, even though the workpieces may differ in certain dimensions. It is known to provide the workstations with automatic adjustment devices that can receive workpieces of different dimensions and adjust for the differences in order to perform properly the desired operation. However, to maximize efficiency of production, workpieces are usually grouped and processed in sets according to the uniformity of certain dimensions. This minimizes the amount of changing-time and thus increases the rate of throughput of finished parts.

One of the problems with conventional pallet conveyor systems is that the support members on the pallets are manually adjusted for the dimensions of the particular workpieces for the production cycle. Conventional pallets have mechanical connecting links or fasteners that must be manually loosened so that the support members can be moved, and then refastened to secure the workpiece support members to the pallet in the proper location. Thus, to change production from a set of workpieces having one uniform dimension to another, either the pallets must be adjusted while the pallets are advancing on the conveyor line or while pulled off the conveyor line. Alternately, the pallets may be replaced with a second set of pallets that are preadjusted for the dimensions of the next set of workpieces. Consequently, changing from one set of workpieces to another requires a significant slowdown or down-time in production.

Another problem with conventional production lines is that the manual adjustment procedure allows for error in the settings used from one pallet to the next. Consequently, the workpieces are not always properly or uniformly carried during the production cycle, which may result in differences in the quality of the finished products.

SUMMARY OF THE INVENTION

It is therefore an object of the present invention to provide an apparatus for automatically adjusting the position of the workpiece support members of a pallet to correspond to the dimensions of a workpiece.

It is another object of this invention to increase the efficiency of pallet conveyor production lines by rapidly and accurately adjusting the workpiece support members to the dimensions of the workpiece to be carried. It also is an object to provide for substantially the same spacing for the support members of pallets that are to carry workpieces of a set or group having certain uniform dimensions.

It is another object of this invention to provide an in-line support member adjustment apparatus and method that will not slow or interrupt production for workpiece change-over.

It is another object of this invention to provide a pallet with a locking means having a release mechanism that can be used to lock support members in place and easily unlocked to permit movement of the support members.

In accordance with this invention, there is provided an apparatus for the automatic adjustment of the distance between two workpiece support members of pallets to adjust for the different dimensions of the workpieces to be operated on by a given pallet conveyor production line. Broadly, the invention concerns a modified pallet and a positioning unit that are constructed to engage so that the positioning unit can be operated to move the support members to a desired position corresponding to the workpiece and, prior to and subsequent to engagement, the support members are locked in place on the pallet.

The pallet of the present invention includes at least two support members that are slideably mounted relative to the pallet and to each other, preferably in a guide channel or on guide rails (herein "guide"). The support members are adapted to move towards and away from each other to accommodate a range of workpiece dimensions appropriate for the given production line. Locking means are provided so that each support member can be secured in place with no movement relative to the pallet, for example, at times other than when the support members are to be adjusted. The locking means includes a release mechanism to unlock the support members so that they can be moved relative to the pallet into a desired position and lock the support members in place. In the preferred embodiment, each support member has a separate locking means. In alternate embodiments, one locking means may be used for all support members.

A vertical translation device also is provided to move the pallet and the positioning unit in engagement. In the preferred embodiment, the translation device is a lifting means for raising and lowering the pallet between a lower position resting on the conveyor of the conveyor line and a higher position above the conveyor line. The higher position is adapted to bring the pallet into contact with the positioning unit as described hereinbelow. An alternate embodiment provides lowering the positioning unit onto the pallet.

The positioning unit of the present invention comprises a release means for actuating the release mechanism of the locking means of the pallet so that the support members can be translated. The positioning unit also includes a movable carriage that is adapted for engaging and interconnecting with a support member, and a drive means for translating the carriage so that when the pallet and positioning unit are interconnected and the locking means is unlocked, movement of the carriage will move the support member of the pallet along the guide accordingly. In the preferred embodiment, the carriage has a bushing that is adapted to interconnect with a pin protruding from a support member.

The pallet of the present invention also may be equipped with a means for lifting the workpiece rapidly, to take it to a workstation for operation, and subsequently return the workpiece to the pallet. This device reduces the amount of time required to perform the operation at the workstation as compared to the time required for the workstation to perform the operation while the workpiece is held by the pallet.

In operation, adjustment of the support members is carried out as follows. The positioning unit is placed at a convenient location, preferably in-line with the production line, more preferably prior to where the workpiece is first placed on the pallet. The pallet is advanced below the positioning unit and raised from its lower position to the higher position. As the pallet approaches the higher position, the releasing means of the positioning unit contacts the locking means to activate the release mechanism to unlock the support member to permit the support member to translate.

At about the same time (or before or after), the carriage of the positioning unit makes contact with and engages a portion of the support member, thereby interconnecting the positioning unit carriage and the support member of the pallet. The drive means of the positioning unit is then actuated to move the carriage, and hence, the support member, to the position associated with the particular dimensions for the workpiece that is to be placed on the pallet. Once the support member is in the proper location, the drive means is stopped and the pallet is lowered, whereby the carriage and the releasing means respectively disengage from the support member and the locking means, and the locking means again locks the support member relative to the pallet. Once in the lower position, the workpiece may be loaded onto the pallet, and the pallet advanced to begin the production cycle.

A microprocessor may be conventionally used to control the alignment and movement of the various elements of the apparatus, to identify the dimensions of the workpiece, and to control the positioning unit drive means accordingly.

In the preferred embodiment, the positioning unit comprises one releasing means, carriage, and bushing means for each support member so that when the pallet is raised, each support member is released and engaged by a corresponding bushing and the support members can be adjusted simultaneously or independently.

In an alternate embodiment, the positioning unit may comprise only one carriage and bushing so that only one support member is moved at a time. In this embodiment, moving more than one support member would require multiple cycles under the positioning unit. In another alternate embodiment, the positioning unit may have one carriage, the carriage having two bushings that are spaced apart, whereby one support member is engaged and adjusted by one bushing and the other support member is engaged and adjusted by the other bushing. In another alternate embodiment, the positioning unit may be adapted to move downwardly onto the pallet to engage and adjust the support members.

The positioning unit drive means may comprise a motor, preferably a stepper motor, that can rotate a screw mechanism with precise control to advance or retract a carriage along the screw to an infinite number of intermediate positions within a range of extreme positions. Thus, the drive means permits precise automatic adjustment of the support members for a large number of workpieces having certain uniform dimensions. It also provides for consistent positioning from pallet to pallet for identically dimensioned workpieces. Computer control of the drive means enhances the automation and precision of operation.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
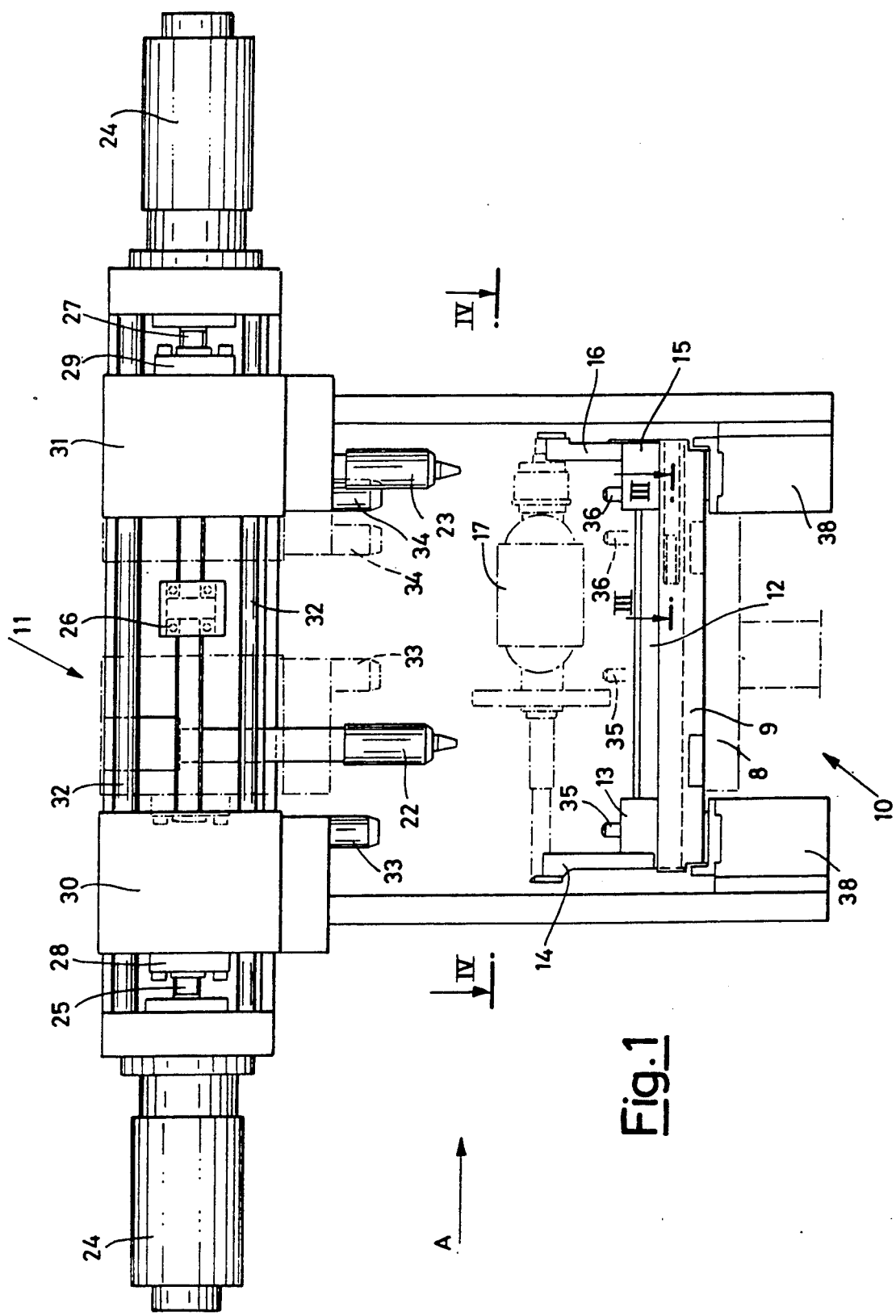
FIG. 1 is a front view of an illustrative embodiment of the pallet and positioning unit of the present invention.

The following discussion refers to a single pallet, but it is to be understood that the discussion extends to a plurality of similar pallets, each of which cooperates with the positioning unit.

As shown in FIGS. 1-5, one embodiment of this invention comprises pallet 10 and positioning unit 11. Pallet 10 includes plate 9 and guide channels 12, mounted on plate 9, adapted for slideably receiving support members 13 and 15. Support members 13 and 15 have respective arms 14 and 16 that are adapted to support workpiece 17 as it is transported from workstation to workstation in the production cycle. In the preferred embodiment, workpiece 17 comprises an armature for an electric motor and the production line machines armatures.

Figure 3:
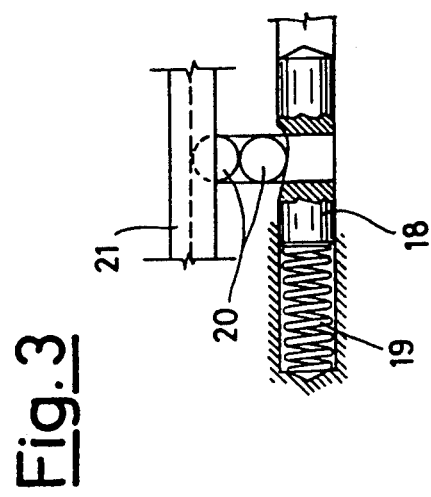
FIG. 3 is a cross-sectional view of a locking means of the embodiment of FIG. 1.

Each support member has an associated locking means for locking the support member in the programmed position, preferably a friction locking mechanism, including a release mechanism that can be activated to unlock the support member, preferably overcoming the frictional locking force. The locking mechanism may be operated independently or simultaneously. Referring to FIG. 3, such a locking system includes wedge 18 urged by spring 19 against element 20 that is inserted in a slot obtained in small plate 21 that is integral to the support member.

Figures 2, 5:
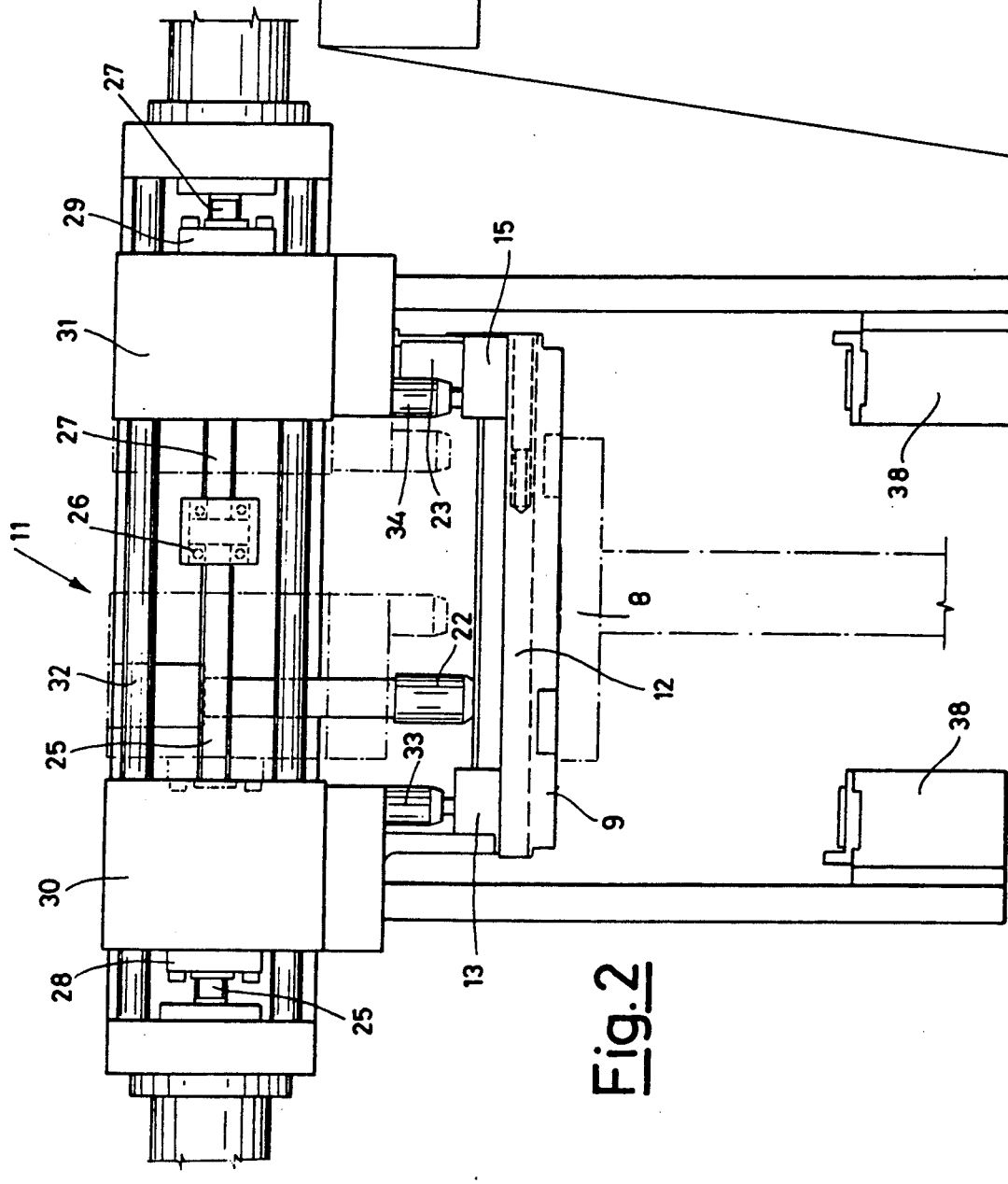
FIG. 2 is a front view of the embodiment of FIG. 1 showing the pallet and positioning unit engaged.
FIG. 5 is a side view of the embodiment of FIG. 1.

Referring to FIGS. 2 and 3, actuating the release mechanism of the locking means occurs by raising pallet 10 until pins 22 and 23 extending downwardly from positioning unit 11 contact and translate respective wedges 18 to overcome the action of springs 19. This action releases locking element 20 from the slot of small plate 21, thereby removing the frictional force locking the support members in place and enabling the displacement of support members 13 and 15. At this point, support members 13 and 15 may be moved by positioning unit 11 to the desired position along guides 12. Pins 22 and 23 may be fixedly mounted on positioning unit 11 to correspond to the fixed locations of locking means wedges 18 on pallet 10.

In an alternate embodiment (not shown) the locking mechanism could be mounted on the support member and the cooperating slot located in the pallet so that the lock translates with the support member. In this embodiment, pins 22 and 23 could be made separate projections extending from carriages 30 and 31 at locations corresponding to the location of the lock on the support members. It also is contemplated that pins 22 and 23 could be disposed interior to bushings 33 and 34 (described below) and the locking means located interior to the portions of the support members that will be engaged by bushings 33 and 34.

Positioning unit 11 also includes two actuators 24 that control the rotation of respective screws 25 and 27 that are coaxial and face each other on a common rest 26 on which they are fitted with bearings (not shown). Screws 25 and 27 engage respective interiorly threaded bosses or apertures 28 and 29 integral to carriages 30 and 31. Carriages 30 and 31 are thus driven by the rotation of screws 25 and 27 along guides 32.

Carriages 30 and 31 have respective bushings 33 and 34 having receptacles that are adapted to engage pins 35 and 36 of support members 13 and 15 respectively, thereby interlocking carriages 30 and 31 with support members 13 and 15. When engaged, movement of carriages 30 and 31 along guides 32 will displace support members 13 and 15 along guide channels 12. Actuators (drive means) 24 control the movement and position of carriages 30 and 31 throughout the full range of travel. This provides the ability to place the carriages in a reference position, e.g., corresponding to the initial position of the support members, and then move the carriages and the engaged support members to a desired, programmed position, e.g., corresponding to the dimensions of the workpiece.

Assuming the first workpiece 17 is to be replaced with a second workpiece having different dimensions, the operation proceeds as follows. First workpiece 17 is removed from arms 14 and 16 by actuators (not shown). To displace support members 13 and 15, it is necessary that no workpiece 17 be resting on arms 17 and 19. The position of the pallet support members 13 and 15 are determined and carriages 30 and 31 are moved to corresponding positions. Pallet 10 is lifted from a lower position on conveyor belt 38 by lifting means 8 and piston 37 and is taken to a higher position (shown in FIG. 2) where pins 22 and 23 engage the corresponding respective wedges 18 of support members 13 and 15, pushing them and compressing springs 19. In this way, small plates 21 are released from the locking elements 20, thereby allowing support members 13 and 15 to slide along guide channels 12.

At about the same time, or before or after, bushings 33 and 34 of carriages 30 and 31 engage pins 35 and 36 as shown in FIG. 2. Thus, support members 13 and 15 can be translated by operating one or both of actuators 24 as illustrated by the dashed lines in FIG. 2 representing the minimum distance between carriages and the full lines representing the maximum distance.

After the carriages and support members have been moved to the desired, programmed positions, pallet 10 is lowered onto conveyor 38. As pallet 10 is lowered, pins 22 and 23 disengage from their respective locking means release mechanisms so that wedges 18 are again forced against elements 20 by springs 19, thereby locking support members 13 and 15 into position. Carriages 30 and 31 may be left in the recently programmed position to begin again the releasing and repositioning operations if it becomes necessary to modify the distance between arms 14 and 16 to machine a new workpiece 17.

Figure 6:
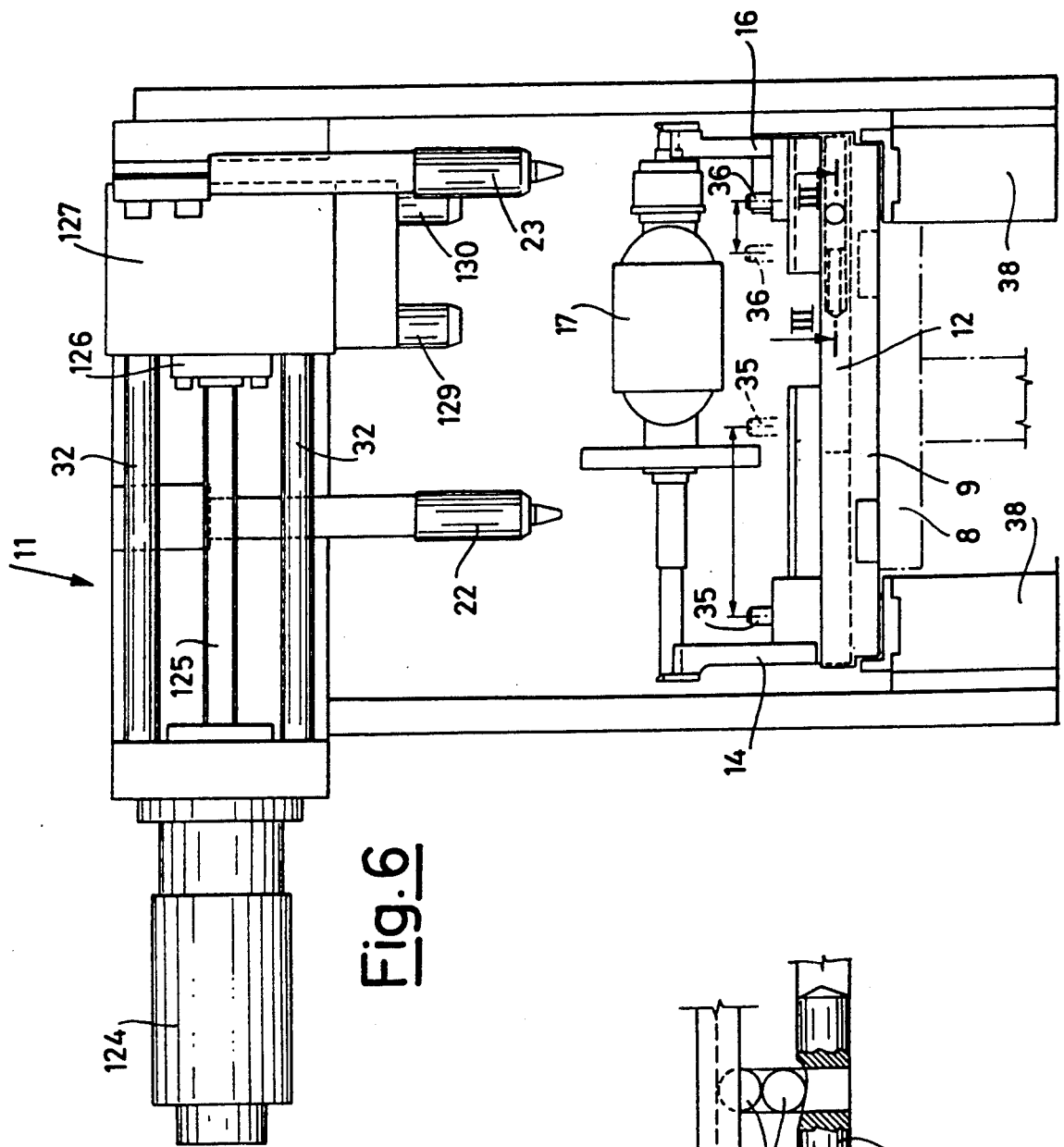
FIG. 6 is a front view of a second illustrative embodiment of the pallet and positioning unit of the present invention.
Figure 7:
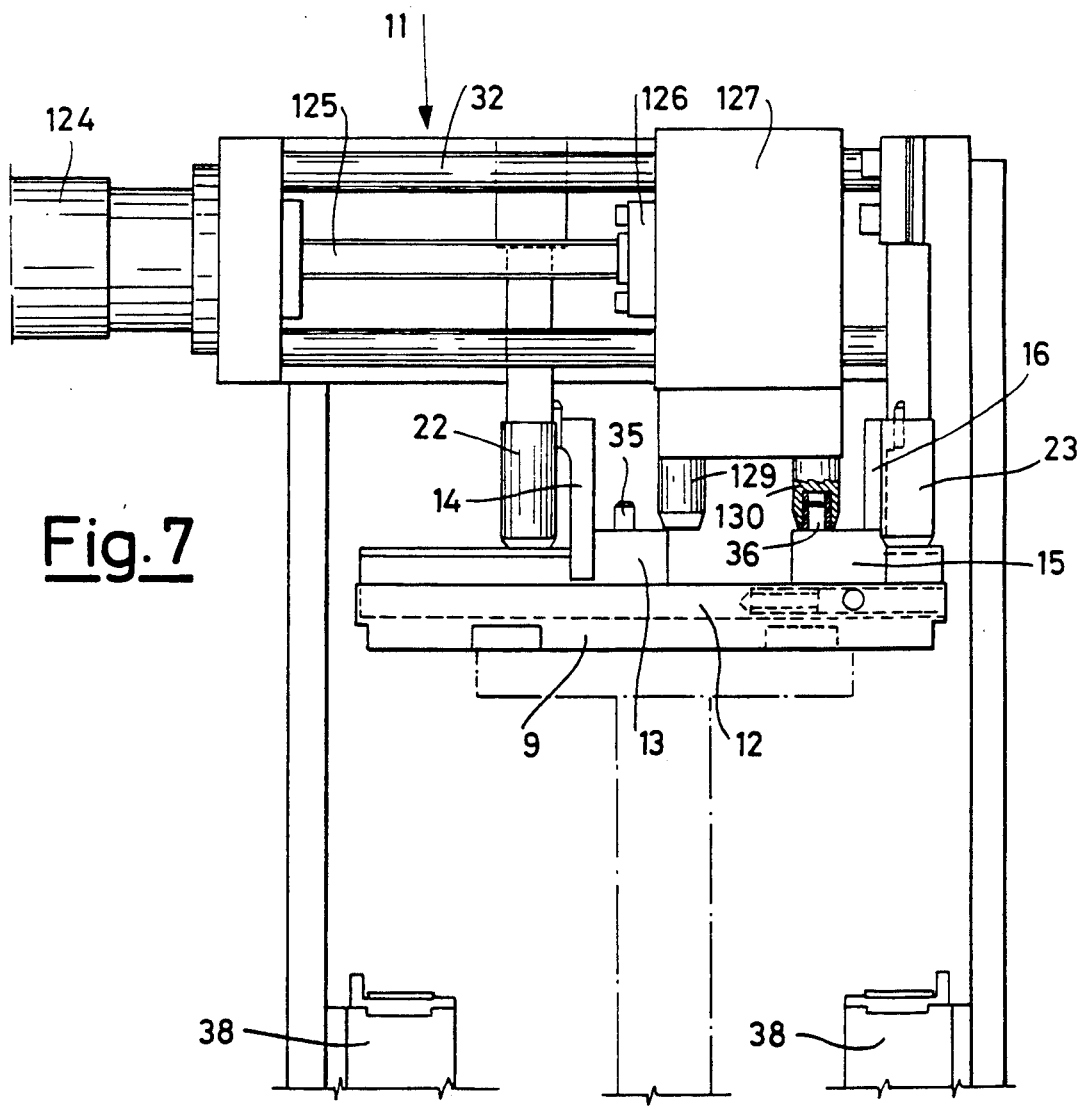
FIG. 7 is a front view of the embodiment of FIG. 6 showing the pallet and positioning unit engaged.

An alternate embodiment of this invention is shown is FIGS. 6 and 7. In this embodiment, positioning unit 11 comprises only one actuator-carriage assembly wherein actuator 124 drives screw 125 on which an internally threaded boss or aperture 126 is assembled integral to carriage 127. Carriage 127 includes bushings 129 and 130. As shown in FIG. 7, when pallet 10 is raised by lift means 8, pins 22 and 23 release the locking means of support members 13 and 15. However, only one of the two bushings 129 or 130 will engage one of pins 35 or 36.

Thus, carriage 127 will displace only the support member that is engaged, as it is driven by actuator 124.

To move the other support arm, pallet 10 is lowered and carriage 127 is moved so that the other of the bushings 129 or 130 will engage the other of pins 35 or 36 when pallet 10 is raised again to move the other of support member 13 or 15 to the desired position. Although this embodiment relies upon two succesive operations of lifting and lowering of pallet 10, the same result of placing arms 14 and 16 of support members 13 and 15 for receiving the appropriate workpiece 17 is obtained. This embodiment is appropriate when rapid changes of position are not required.

The positioning unit described in each of these embodiments permits positioning the support members to an infinite number of positions between the minimum and maximum of the range of travel of support members 13 and 15.

Figure 4:
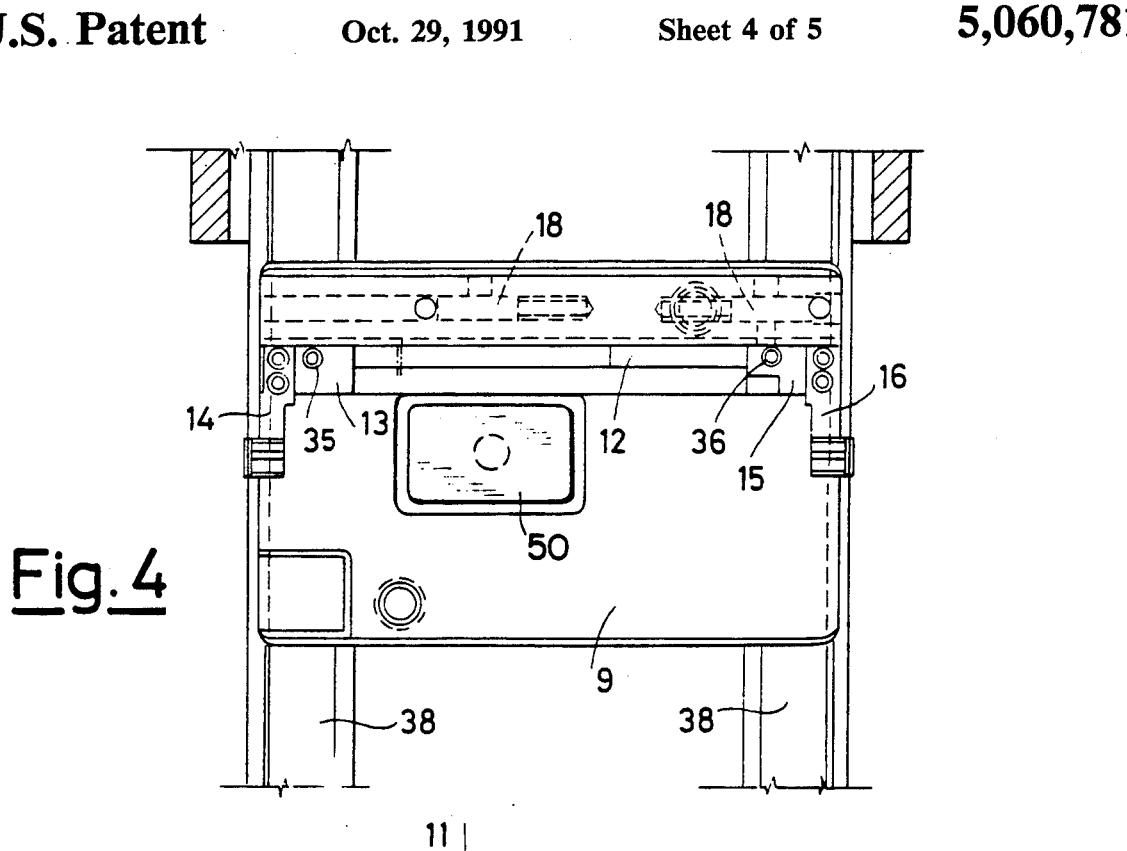
FIG. 4 is a top sectional view taken along line III—III of FIG. 1.
Figure 8:
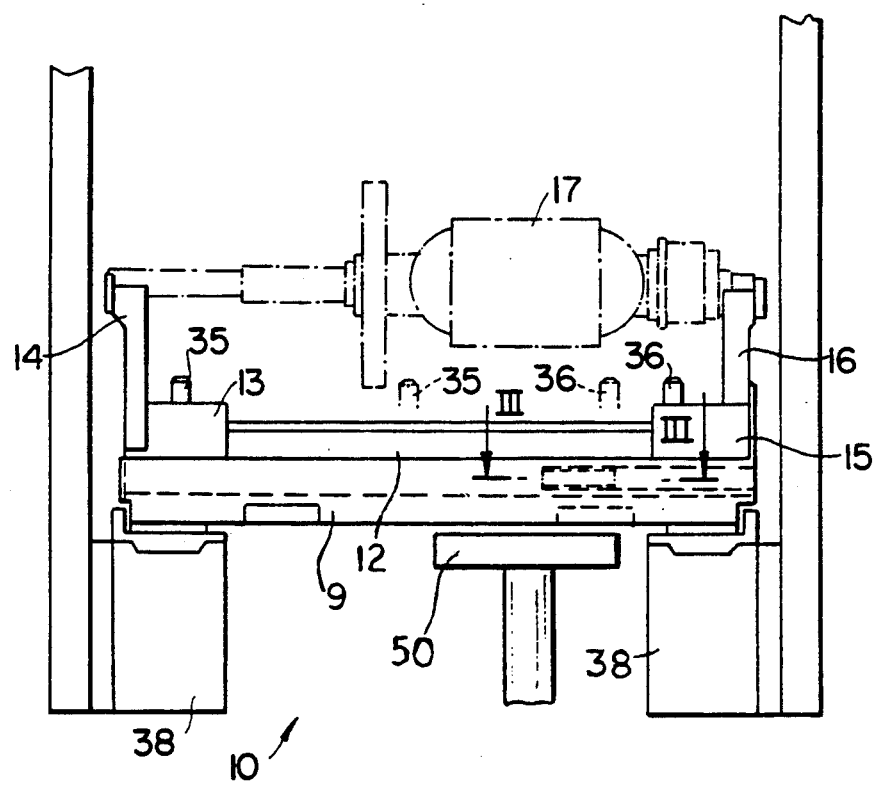
FIG. 8 is a front view of a pallet and workpiece lifting means in accordance with an embodiment of the present invention.

Referring to FIGS. 4 and 8, pallet 10 may include an aperture adapted to permit a piston type lifting device 50 for lifting workpiece 17 from pallet 10 to a workstation, and then to lower the workpiece back to its rest position for transport. Alternately, the workstation may include gripper means for grasping the workpiece from above to transfer the workpiece to and from the workstation.

One skilled in the art will appreciate that the present invention can be practiced by other than the described embodiments, which are presented for purposes of illustration and not of limitation, and the present invention is limited only by the claims which follow.

We claim:

1. In a production line for workpieces including a pallet for supporting a workpiece, and a means for advancing pallets carrying workpieces, apparatus for manipulating a workpiece on and off the pallet comprising:

means associated with said pallet for defining an aperture through said pallet;

a first support member and a second support member for supporting a workpiece so that the workpiece is suspended over said aperture, said first and second support members being releasably secured to the pallet by an automatic positioning means for adjusting the position of said support members relative to said aperture so that said support members can be relatively moved to support workpieces having different dimensions over said aperture; and lifting means for raising and lowering a workpiece off or onto said support members of the pallet, said lifting means passing through said aperture of the pallet to raise or lower the workpiece off or onto said support members.

2. The apparatus of claim 1 wherein said means for lifting a workpiece further comprises a piston-type lifting device.

* * * * *